May 24, 1927.
C. H. JOHNSON
DIRECTION INDICATOR
Filed April 14, 1926
1,630,014
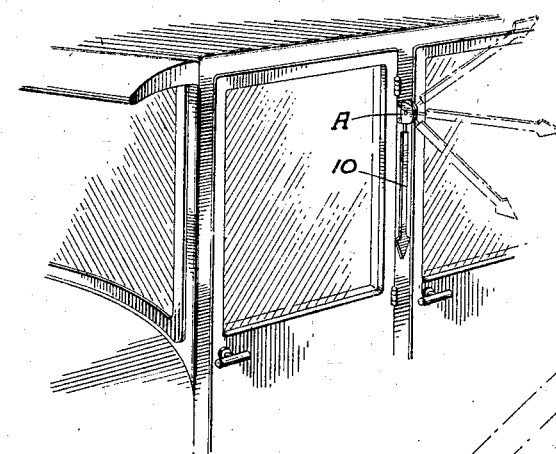
*Fig.1.*
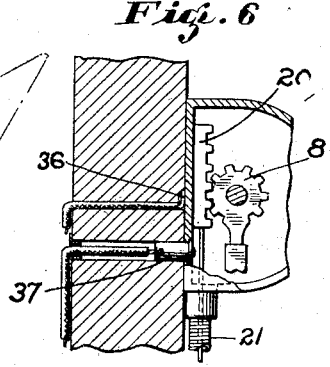
*Fig.6.*
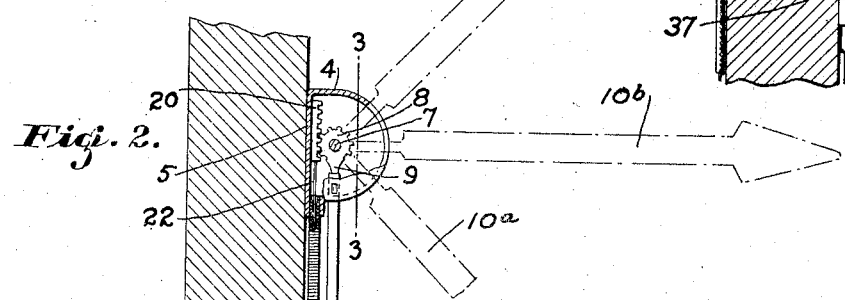
*Fig.2.*
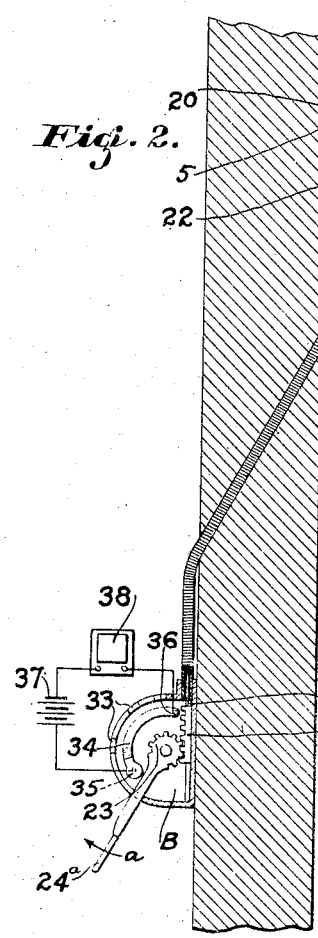
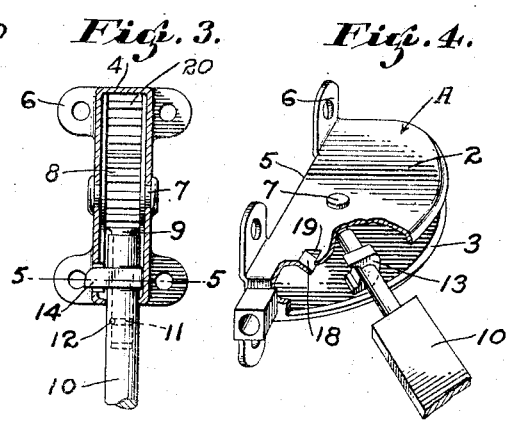
*Fig.3.*   *Fig.4.*
*Fig.5.*
INVENTOR.
Charles H. Johnson.
BY
Townsend, Loften & Abbett
ATTORNEYS.

Patented May 24, 1927.

1,630,014

UNITED STATES PATENT OFFICE.

CHARLES H. JOHNSON, OF SACRAMENTO, CALIFORNIA.

DIRECTION INDICATOR.

Application filed April 14, 1926. Serial No. 101,851.

This invention relates to direction indicators for automobiles and like vehicles, and particularly to improvements on the structure shown in my co-pending application entitled "Direction indicator" filed February 23, 1926, Serial Number 89,850.

The object of the present invention is to generally improve and simplify the construction and operation of direction indicators; to provide a direction indicator in the form of an arm, arrow, or the like, which may assume any one of several signalling positions when in use, and which is held flat against the outer surface of the car when not in signalling position, thereby rendering it possible to apply a direction indicator to closed types of automobiles and like vehicles without impairing the finish or general appearance; to provide means whereby the direction indicator may be operated from the interior of the car; and further, to provide an alarm mechanism which audibly sounds a continuous alarm as long as the direction indicator assumes a signalling position, thereby insuring retraction of the signal after turning, slowing down, or otherwise.

The invention is shown by way of illustration in the accompanying drawings, in which Fig. 1 is a perspective view of the type of vehicle showing the application of the direction indicator;

Fig. 2 is an enlarged vertical section showing the mechanism of the direction indicator;

Fig. 3 is an enlarged cross-section on line 3—3 of Fig. 2;

Fig. 4 is a perspective view of the direction indicator housing, said view being partly broken away;

Fig. 5 is an enlarged cross-section on line 5—5 of Fig. 3.

Fig. 6 shows a modified form of the circuit-closing mechanism employed in conjunction with the audible alarm.

Referring to the drawings in detail, particularly Figs. 1, 2, 3 and 4, A indicates in general a casing which consists of a pair of parallel interspaced side plates 2 and 3. These plates are connected at the upper end by end sections 4. They are also connected by a base section 5, which is provided with perforated lugs 6, so as to permit the casing to be securely attached to the exterior surface of an automobile body or the like. Extending through the side plates 2 and 3 is a horizontal pin 7 on which is journaled a pinion gear 8. Forming a extension of the pinions is a short arm 9, and carried by the arm is an indicating arm 10. The arm 9, together with the indicating arm carried thereby, is adapted to swing about the horizontal axis 7 to assume any one of the dotted line signalling positions indicated at $10^a$, $10^b$ and $10^c$. The indicating arm is also adapted to turn on the longitudinal axis of the arm 9, and a swivel joint is therefor formed between the arm sections 9 and 10. That is, the inner end of the arm 10 is provided with a recess or socket for the reception of the arm 9. The outer end of the arm 9 is grooved as indicated at 11, and a pin 12 passing through the arm 10 secures the arm 10 against movement, and at the same time permits turning movement about the arm 9.

Formed or otherwise secured on the inner end of the arm 10 is a collar 13, and formed on the collar are two lugs such as indicated at 14 and 15. The collar is provided with two other faces, 16 and 17. The spacing between said faces is equal to the spacing between the inner faces of the side plates 2 and 3. The other faces of the collar normally form a guide for the arm 10, which secures the arm against turning movement upon a longitudinal axis. However, a turning movement of one-quarter revolution is imparted to the arm 10 during a portion of its movement, and this is accomplished as follows:

Formed in the side plate 2 of the housing is a lug 18 which is formed by cutting the side plate and bending the cut portion inwardly as shown in Figs. 4 and 5. An opening 19 is at the same time formed, through which the lug 14 projects when the arm 10 assumes normal or inoperative position.

Guided between the side plates 2 and 3 is a rack bar 20. Secured to the lower end of the casing is a flexible tubing 21, and extending therethrough is a push-and-pull wire or cable 22, which is secured to the lower end of the rack bar. The flexible tubing passes through the body of the automobile by drilling a hole for the lug as shown in Fig. 2, and the lower end of the tubing is connected to a housing generally indicated at B. This housing also consists of a pair of interspaced side plates. A pinion 23 is journaled between the plates, and it engages the rack bar 24, which is guided between the plates. The pinion terminates in a lever 24ª which is manually operated. By turning the lever about the battery 23, reciprocating movement is imparted to the rack bar 24, and as the lower end of the wire 22 is secured to the rack bar 24 as at 25, reciprocal movement will also be imparted to the rack bar 20, and rotary movement to the pinion 8. Such rotary movement causes the arms 9 and 10 to swing about the horizontal axis 7, and the arm may accordingly assume any one of the signalling positions indicated at 10ª, 10ᵇ and 10ᶜ. When the operating lever 24ª is grasped and swung in the direction of arrow a, rack bars 24 and 20 are reciprocated in unison, and the pinions 8 and 23 are also rotated in unison. The operating tendency of pinion 8 is to swing the arm 10 as indicated. However, rotation is also imparted to the arm 10 about the longitudinal axis of the arm 9. This is due to the fact that lug 14 projects through the opening 19 in the side plate 2 and as such engages the shoulder 13 formed at the upper end of the opening 19. Engagement of the lug 14 with the shoulder 30 causes the collar 13, together with the arm 10, to rotate about the longitudinal axis of the arm 9 in the direction of arrow b in Fig. 5. The rotation will continue until the other side 16 and 17 of the collar engages the inner faces of the side plates 2 and 3, when further rotation is prevented. A quarter-revolution is imparted by engagement of the lug 14 with the shoulder 30, and this quarter-revolution takes place while arm 10 is swinging from the full line position shown in Fig. 2 to the dotted line position indicated at 10ª. Further rotation is prevented, therefore, due to the engagement of the flat faces 16 and 17 with the side face of the housing, and the arm will accordingly continue to swing about its horizontal axis 7 without further rotation about its longitudinal axis. When the arm 10 is moved from any of the signalling positions down to the full line position shown in Fig. 2, lug 14 will engage the lug 18, and a reverse rotary movement will be transmitted to the arm 10, until it assumes the position shown in Fig. 5. This quarter rotation of the arm permits it to lie over against the body of the automobile as shown in Figs. 1 and 2 when assuming inoperative position, and it permits it to swing broadside when assuming any one of the signalling positions. The arm, in other words, occupies comparatively little space when it is in operating position, and as one or both sides of the arrow may be painted to conform to the finish of the automobile top, it is obvious that it will not impair the finish or the general appearance, and will at no time appear bulky or cumbersome, as the casing A by which it is supported is a comparatively narrow and small one, thus permitting it to be attached to one of the side posts of the automobile top shown in Fig. 1.

By referring to Fig. 2 it will be noted that a series of notches 33 are formed in one of the side plates of the casing B. These notches serve the function of locking the operating lever 24ª in any one of the signalling positions; that is, the operating lever will engage the first notch when the signalling position 10ª is assumed; the second notch when the signalling position 10ᵇ is assumed; and so on. In actual operation, the driver sets the signal prior to making a turn, and leaves the signal in this position until the turn has been completed. It sometimes happens that he forgets to retract the signal, and as this is not desirable, due to the confusion to other drivers, applicant has provided means for audibly warning the driver that the direction indicating arm is assuming a signalling position. He accomplishes this by placing a contact segment 34 in the housing B. This contact segment is a spring arm which is secured at one end, as at 36. The opposite end is free, but is depressed by the lever 24ª when this swings over the segment. When the spring arm is depressed it engages the contact 35, and as such closes the circuit to a battery 37 and a buzzer or bell 38. This buzzer or audible alarm mechanism will continue to sound as long as the indicating arm assumes the signalling position, and the driver is accordingly reminded of the fact that the arm should be retracted. The operating lever 24ª moves out of engagement with the spring contact segment 24 when the arm is retracted to normal or inoperative position, and the circuit to the buzzer is thus broken and ceases to operate when the arm is retracted. A horn or any other alarm mechanism may of course be used.

In Fig. 2 the alarm is shown as actuated by the operating lever 24ª. By referring to Fig. 6 it will be noted that a circuit may be closed by means of the rack bar 20. In that instance one side of the circuit is connected with the base of the housing, as shown at 36, while the other side of the circuit is connected to a push button 37. During downward movement of the rack bar while the signalling arm is moving into position, the rack bar engages the push button and closes the circuit, thereby sounding the alarm when the arm reaches signalling position. Not only that, but it also maintains the circuit through the alarm mechanism as long as the signalling arm remains in signalling position. In actual practice it is preferred to place the circuit making and breaking mechanism at the point shown in Fig. 6, as this has proven most practical.

The invention is of course more or less specifically illustrated; but I wish it understood that changes may be resorted to within the scope of the appended claims; similarly, that the materials and finish of the several parts employed may be such as the experience and judgment of the manufacturer may dictate or various conditions may demand.

Having thus described my invention, what I claim as new and desire to secure by Letters Patent is:

1. In a direction indicator of the character described, a casing comprising a pair of parallel, interspaced plates, an arm pivoted at one end on a horizontal axis between said plates, means for swinging said arm about the horizontal axis to assume different signalling positions, a collar on the arm, a lug on one of the side plates and a lug on the collar engageable with the side plate lug to rotate the arm one-quarter revolution upon its longitudinal axis, said collar engaging the inner faces of the casing plates and normally securing the arm against turning movement upon its longitudinal axis.

2. A direction indicator comprising a casing, said casing having a pair of interspaced parallel side walls, an arm pivoted at one end in the casing, means for swinging the arm about the pivot between the side walls to assume a plurality of signalling positions, said positions being a downward vertical inoperative position, a horizontal right angular position and two 45 degree positions, means for rotating the arm a quarter of a revolution above its longitudinal axis when moved from the vertical downward position to the first 45 degree position, and means for maintaining the arm in said turned position and against rotation while moving from the first 45 degree position to the horizontal position and to the second 45 degree position.

3. A signalling device of the character described comprising a casing, said casing having a pair of interspaced side walls, an arm pivoted between the walls and normally adapted to assume an inoperative position, means for swinging the arm about its pivot from said inoperative position to assume a plurality of different signalling positions, means whereby the arm is turned a quarter revolution about its longitudinal axis while being swung from its inoperative position to a first signalling position and means for maintaining the arm in said turned position and against turning movement when swinging it to assume other signalling positions.

CHARLES H. JOHNSON.